US007130169B2

(12) United States Patent
Ziemer et al.

(10) Patent No.: US 7,130,169 B2

(45) Date of Patent: Oct. 31, 2006

(54) SHORT CIRCUIT PROTECTION FOR A POWER ISOLATION DEVICE AND ASSOCIATED DIODE

(75) Inventors: Kevin W. Ziemer, Plano, TX (US); Fredrick W. Trafton, Lewisville, TX (US)

(73) Assignee: Texas Instruments Incorporated, Dallas, TX (US)

(*) Notice: Subject to any disclaimer, the term of this patent is extended or adjusted under 35 U.S.C. 154(b) by 474 days.

(21) Appl. No.: 10/119,991

(22) Filed: Apr. 10, 2002

(65) Prior Publication Data

US 2003/0193764 A1 Oct. 16, 2003

(51) Int. Cl.
*H02J 1/04* (2006.01)
*H02J 9/06* (2006.01)

(52) U.S. Cl. .......................... 361/18; 361/101; 307/64; 307/65; 307/80; 307/85

(58) Field of Classification Search ................. 361/18, 361/100; 307/64, 85, 65, 80
See application file for complete search history.

(56) References Cited

U.S. PATENT DOCUMENTS 4,161,760 A 7/1979 Valentine
4,638,175 A * 1/1987 Bradford et al. .............. 307/64
5,465,011 A * 11/1995 Miller et al. .................. 307/64
5,598,041 A * 1/1997 Willis .......................... 307/43
5,814,956 A * 9/1998 Kono et al. ................. 318/380
5,889,629 A * 3/1999 Patton, III ................... 360/75
5,949,273 A 9/1999 Mourick et al.
5,953,173 A 9/1999 Klaassen et al.
6,144,115 A * 11/2000 Massie et al. ................ 307/80
6,462,926 B1 * 10/2002 Zaretsky et al. ............ 361/103
6,657,319 B1 * 12/2003 Sanada ........................ 307/45

* cited by examiner

*Primary Examiner*—Brian Sircus
*Assistant Examiner*—Z Kitov
(74) *Attorney, Agent, or Firm*—Carlton H. Hoel; W. James Brady, III; Frederick J. Telecky, Jr.

(57) ABSTRACT

Short circuit protection is provided for an isolation component that has a parasitic diode as an inherent part of its construction. The isolation component may or may not be contained in an integrated circuit. In response to detecting a short circuit condition based on voltages at one or more input terminals of the integrated circuit, or based on current between the terminals, the isolation component is activated to facilitate current flow through the isolation component, such as to reduce total power dissipation in the isolation component during at least part of the short circuit condition.

33 Claims, 5 Drawing Sheets

154
170
152
174
150
162
168
160
172
164
156
158
166
130
116
V PUMP
POR
OVST
GND

SHORT CIRCUIT PROTECTION FOR A POWER ISOLATION DEVICE AND ASSOCIATED DIODE

TECHNICAL FIELD

The present invention relates generally to short circuit protection and, more particularly, to a system and method to protect a device or an integrated circuit from short circuit conditions.

BACKGROUND OF THE INVENTION

Electronic devices employ electrical circuits implemented as one or more integrated circuits (ICs) for numerous applications. For example, ICs are configured to achieve desired functions, for example, control of associated devices, digital-to-analog (D/A) or analog-to-digital (A/D) conversion, mixed signal analysis, etc.

An IC receives electrical energy from an external power supply at one or more input terminals to provide operating power for performing desired functionality. In some IC configurations, a power device may be used to isolate the external supply from another internal or external node. This isolated node becomes a temporary power source for the IC when the external supply becomes low or is disconnected. This node is usually coupled to internal circuitry in an IC.

For example, in some ICs that drive motors, the isolated node is normally supplied with power from an external supply. The power flows through the isolation device to the isolation node under these normal conditions. When the external supply is too low or unavailable, the isolation device can be turned off and the isolated node is supplied with power from the spinning motor. Many types of power devices, such as Field Effect Transistors (FETs), have a parasitic diode that is an inherent part of their construction. The polarity of this diode is arranged so that it is reverse biased when the external supply voltage is lower than the isolation node voltage. An unexpected short condition at the terminal of such an isolated node can cause undesirable conditions within the isolation device. For example, if the terminal is shorted to ground potential, electrical current can flow from the external power supply to the isolated node because the parasitic diode is forward biased. This current can become quite large which, in turn, can adversely affect the isolation device. If the isolation device is part of an IC, the current can adversely affect other circuitry within the IC and, in turn, associated external circuitry and equipment.

Various approaches have been proposed to help protect the power isolation device and associated circuitry during a short circuit condition, such as may occur at a terminal of an IC. For example, a Schottky diode can be connected between the power supply terminal and the isolation terminal. The Schottky diode is thus in parallel with, and has the same polarity as, the parasitic diode. In such an arrangement, most of the current during a short circuit condition would flow through the Schottky diode because it has a relatively low forward bias voltage compared to the forward bias voltage of the parasitic diode of a typical isolation device. However, if the Schottky diode is added to the IC as an off-chip component, it adds significantly to the overall cost of the resulting system. An on-chip Schottky diode requires a large amount of die area and, therefore, would increase die cost for the IC.

An alternative approach is to employ a fuse to operate during a short circuit condition. In this approach, it may be difficult to select a fuse that is capable of providing adequate protection during a short circuit, while permitting desired normal operation of the IC. This approach also has the drawback that normal operation cannot resume if the short is removed.

Another alternate approach is to employ back-to-back power isolation devices. In such an arrangement, two power devices are placed in series such that the associated parasitic diodes have opposite polarities. This approach also adds significantly to the overall cost of the resulting system because of the need for the additional power device.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention generally relates to providing short circuit protection for a device or an integrated circuit. The voltage and/or currents at one or more terminals of the integrated circuit can be monitored to determine if a short circuit condition exists. In response to detecting the short circuit condition at one input terminal, controls can be implemented to activate an isolation component so as to enable current to flow through the isolation component rather than through its associated parasitic diode. Activation of the isolation component during the short circuit condition enables a reduction in power dissipation through the component, which results in a corresponding decrease in heat being generated.

In one aspect of the present invention, a short circuit condition might exist if one of the input terminals is at or near electrical ground potential. In a second aspect, a short circuit condition might depend on the voltage at more than one input terminal. For example, a short circuit condition is determined to exist if a first input terminal is at or near electrical ground while a second input terminal is at a level greater than ground.

In a third aspect, a short condition might depend on the detection of a large current through one or more terminals or through an electrical component. In a fourth aspect, a short condition might exist based on the detection of a large current and if one of the input terminals is at or near electrical ground potential. For example, a short circuit condition is determined to exist if a first input terminal is at or near electrical ground while a large current is detected at a second input terminal or through a device.

According to yet another aspect of the present invention, the isolation component can be implemented as an isolation transistor (e.g., a Field Effect Transistor) coupled between an input terminal and a node to which internal circuitry is coupled. The input terminal that is being monitored for the occurrence of a short circuit condition is also electrical coupled to the node.

Another aspect of the present invention provides a methodology for implementing short circuit protection at an integrated circuit. The methodology includes detecting whether a short circuit condition exists at an input, such as based on current and/or voltage at the input. If the short circuit condition exists, an associated power device having an associated diode can be activated to an on condition so as to reduce the voltage drop across the power device.

The following description and the annexed drawings set forth certain illustrative aspects of the invention. These aspects are indicative, however, of a few ways in which the principles of the invention may be employed. Other advantages and novel features of the invention will become apparent from the following detailed description of the invention when considered in conjunction with the drawings.

DETAILED DESCRIPTION OF THE INVENTION

The present invention generally relates to providing short circuit protection for a device or an integrated circuit ("IC") based on the voltages and/or currents at one or more terminals or devices of the IC. In response to detecting a short circuit condition using one or more terminals or devices of the IC, an isolation component is activated to facilitate current flow through the isolation component, which reduces power dissipation in that component.

Figure 1:
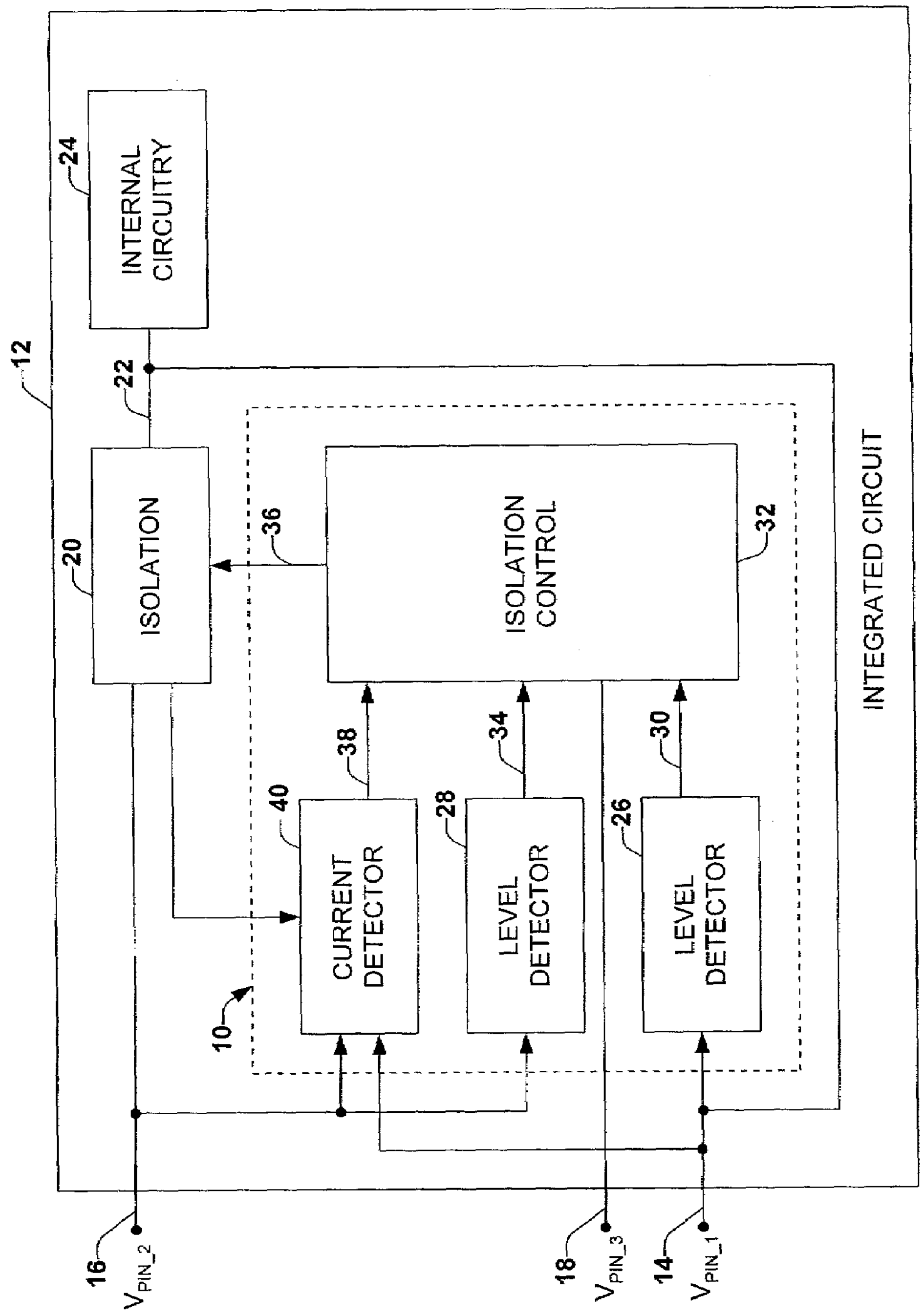
FIG. 1 is a block diagram illustrating a short circuit protection system in accordance with an aspect of the present invention.

FIG. 1 illustrates an example of a short circuit protection system 10 in accordance with an aspect of the present invention. As illustrated in FIG. 1, the system 10 is part of an integrated circuit 12 that includes one or more input terminals 14, 16 and 18. The respective input terminals 14, 16, and 18 have corresponding voltages, indicated at $V_{PIN\_1}$, $V_{PIN\_2}$, and $V_{PIN\_3}$, such as are supplied by one or more power supplies external to the IC 12. The input terminal 16 is connected to the short circuit protection system 10 and to an isolation component 20. The isolation component 20 is connected between the input terminal 16 and a node 22 to which internal circuitry 24 also is connected. Note that the isolation component 20 does not have to be internal to the IC 12, but can be a separate external device. The input terminal 14 also is connected to the system 10 and to the node 22. Thus, the node 22 corresponds to a power supply node for powering the internal circuitry 24.

Referring to the internal contents of the protection system 10, the input terminals 14 and 16 are respectively coupled to level detectors (e.g., comparators or level detectors) 26 and 28. Each of the level detectors 26, 28 receives respective voltage signals $V_{PIN\_1}$, $V_{PIN\_2}$ to determine the level of such signals. The level detector 26 provides a signal 30 to a control system 32 based on the level of the input signal $V_{PIN\_1}$ at 14. Similarly, the level detector 28 provides a signal 34 to the control system 32 based on the level of the input signal $V_{PIN\_2}$ at 16. The isolation control system 32 generates a control signal 36 to control operation of the isolation component 20, which can be based on the level of one or both of the input signals $V_{PIN\_1}$ and $V_{PIN\_2}$.

By way of example, the level detector 26 may provide the signal 30 to the isolation control system 32 to indicate whether the terminal 14 has been shorted to ground based on the voltage level $V_{PIN\_1}$. In particular, if $V_{PIN\_1}$ is at or near electrical ground potential, the signal 30 indicates the occurrence of a short circuit condition. The isolation control system 32 provides the control signal 36 to activate the isolation component 20 in response to the signal 30. As a result, the isolation component 20 is turned on so as to conduct current from the input terminal 16 to the node 22 (e.g., it is activated as a low resistance path or a short). Thus, according to this aspect of the present invention, the isolation control 32 operates the isolation component based only on the voltage $V_{PIN\_1}$ at the input terminal 14 (e.g., the level detector 28 may be absent from the example shown in FIG. 1).

Because the voltage level $V_{PIN\_1}$ at the terminal 14 could reach ground potential or near ground potential in situations other than a short circuit condition, the isolation control system 32 can control operation of the isolation component 20 based on both the voltage $V_{PIN\_1}$ at the terminal 14 and the voltage $V_{PIN\_2}$ at the terminal 16. That is, the level detector 28 provides the signal 34 to the isolation control system 32 based on the level of the input signal $V_{PIN\_2}$. Specifically, the signal 34 may indicate whether the signal $V_{PIN\_2}$ at the terminal 16 is above electrical ground potential or a selected reference level above electrical ground.

With the combination of the level detectors 26 and 28, the isolation control 32 provides the control signal 36 to activate the isolation component 20 in response to (i) the signal 30 indicating that the signal $V_{PIN\_1}$ at input terminal 14 is at or near ground potential and (ii) the signal 34 indicating that the input signal $V_{PIN\_2}$ at input terminal 16 is above ground potential. By requiring both conditions (i) and (ii) be satisfied to control operation of the isolation component 20, unnecessary activation of the isolation component can be mitigated in accordance with an aspect of the present invention.

For example, some types of external power supplies are shorted to ground potential when they are switched off. If such a supply was connected to the terminal 16 of the IC 12, which included a protection system configured to activate the isolation component 20 based only on the $V_{PIN\_1}$ signal at 14 being low, such operation could cause undesirable effects in certain circumstances. Such circumstances include the occurrence of a short at the terminal 16.

In another implementation, the system 10 includes a current detector 40 that monitors the current in the isolation component 20. The current detector 40 provides a signal 38 to the isolation control 32 that indicates whether, for example, a high current condition exists in the isolation component 20. The isolation control 32 provides the control signal 36 to activate the isolation component 20 in response to the signal 38 and at least one of signals 30 and 34. The current detector 40 could, in a similar manner, monitor the current at the terminals 14 and/or 16. The current detector 40 would perform the same function in this case. It would provide signal 38 to the isolation control 32 to indicate that a high current condition existed at 14 and/or 16.

With the combination of the level detector 26 and the current detector 40, the isolation control 32 provides the control signal 36 to activate the isolation component 20 in response to (i) the signal 30 indicating that the signal $V_{PIN\_1}$ at input terminal 14 is at or near ground potential and (ii) the signal 38 indicating that there is a high current condition either in the isolation component 20 or at one or both of the terminals 14 and 16. By requiring both conditions (i) and (ii) be satisfied to control operation of the isolation component 20, unnecessary activation of the isolation component can be mitigated in accordance with an aspect of the present invention.

Figure 2:
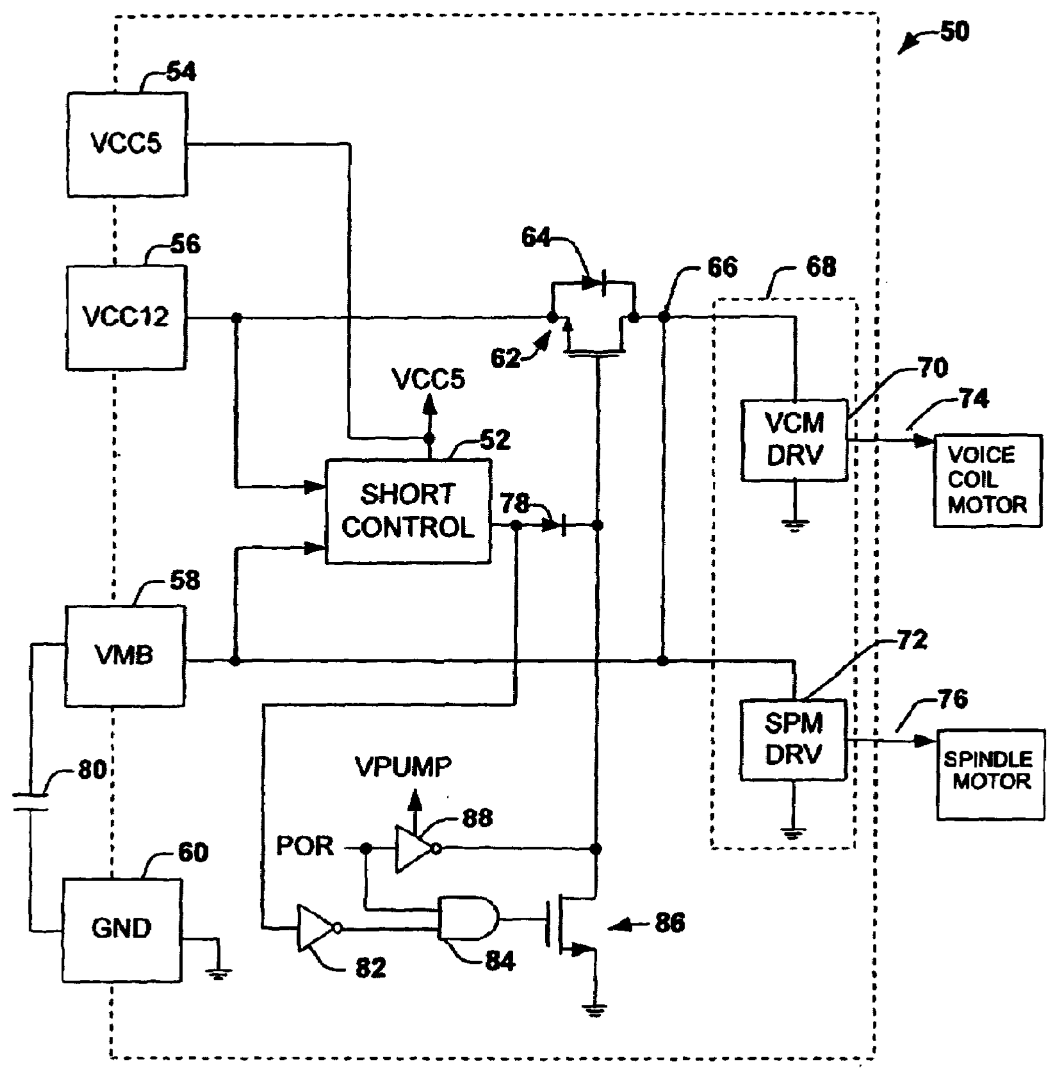
FIG. 2 is a block diagram illustrating an example of an integrated circuit implementing a protection system in accordance with an aspect of the present invention.

FIG. 2 illustrates an example of an integrated circuit 50 that includes a short circuit protection control system 52 in accordance with an aspect of the present invention. In the integrated circuit 50, four terminals or pins 54, 56, 58 and 60 are illustrated, although it is to be appreciated that the integrated circuit typically will have a greater number of input terminals. Of course, a fewer number of input terminals also could be used in an integrated circuit in accordance with an aspect of the present invention. The terminal 54 corresponds to a voltage control channel (VCC5) to provide a desired voltage level to the protection system 52. The input terminal 56 corresponds to another voltage control channel (VCC12) that, for example, corresponds to a voltage level that is higher than the level at 54.

The terminal 56 is coupled to an isolation component, such as an isolation field effect transistor (FET) 62. The isolation FET 62 also includes a parasitic diode 64 connected in parallel with the FET. The parallel combination of the isolation FET 62 and diode 64 are connected between the terminal 56 and a node 66 to which internal circuitry 68 is coupled. When the isolation FET 64 is off, it thus operates to electrically isolate the external supply provided at 56 from the internal circuitry 68.

In the example illustrated in FIG. 2, the IC 50 is depicted as an IC configured to control one or more motors of a storage media device, for example. Thus, the circuitry 68 includes driver circuits 70 and 72 for respectively driving a voice coil motor (VCM) and a spindle motor (SPM). Accordingly, the driver 70 has one or more outputs 74 that provide output signals for providing electrical current to respective phases of the VCM. Similarly, the driver 72 includes one or more outputs 76 that provide output signals to energize a respective phase or phases of the associated SPM.

The terminal 56 also is coupled to the short circuit protection system 52, which provides an indication of voltage level at the input 56. The input terminal 58 also is connected to the protection system 52 and to the node 66. The short circuit protection system 52 includes circuitry operative to detect whether a short circuit condition exists at the terminal 58 of the IC 50 in accordance with an aspect of the present invention.

In the example illustrated in FIG. 2, the short circuit protection system 52 is coupled to a gate of the isolation FET 62 through a diode 78. This affords control of the isolation FET 62 based on the level of the signal provided by the protection system 52. For example, when the protection system 52 detects a short circuit condition, it activates the isolation FET 62 to conduct current substantially freely through the FET.

In the IC 50 in FIG. 2, a capacitor 80 is connected between the terminal 58 and the ground terminal 60. Therefore, a short circuit condition can exist at the input terminal 58, for example, if some conductive object creates a bridge between the terminals 58 and 60 or if the capacitor 80 develops an internal short. A short in the input terminal 58 further could cause a power on reset condition by pulling down the input pin 56. This condition, in turn, causes the gate of the isolation FET 62 to connect ground, thereby turning the isolation FET off. However, when the protection system 52 detects a short circuit condition, its output is high, such that the output of the AND gate 84 is low. In addition, the diode 78 is forward biased to activate the isolation FET 62 via the signal from the short circuit protection system 52. The power to operate the short circuit protection system 52, including during a short circuit at 58, can be from another power supply, such as VCC5 provided at the terminal 54. Alternatively or additionally, power could be derived from the terminal 56 or another source of power internal or external to the IC 50.

In the absence of a protection system 52, in accordance with an aspect of the present invention, if the input terminal 58 is shorted to ground when the isolation FET 62 is off and the input 56 is able to provide current, a significant amount of current could flow from the input 56 to the terminal 58 to ground. In such a condition, the parasitic diode 64 of the isolation FET 62 could be forward biased and conduct current. The forward voltage and series resistance of the diode 64 creates a voltage drop across the device 62, which results in power dissipation and heat. The short circuit protection system 52 reduces the power dissipation across the isolation FET 62 by turning on the FET in such a short circuit condition so as to effectively limit the voltage drop across the FET. That is, the voltage across the isolation FET 62 will be generally limited so as to reduce the power dissipation that would occur otherwise across the parasitic diode and associated series resistance.

In one aspect of the present invention, the short circuit protection system 52 can control operation of the isolation FET 62 during a short circuit condition in response to detecting that the voltage at the terminal 58 is at or near ground potential. Alternatively, the short circuit protection system 52 may control operation of the isolation FET 62 during a short circuit condition in response to the voltage levels provided at both terminals 56 and 58. For example, the protection system 52 may activate the isolation FET 62 to an on condition when the voltage at 58 is at or near ground and when the voltage at 56 is above ground.

As mentioned above, it may be undesirable to turn the isolation FET 62 off in certain circumstances even if the voltage at the terminal 58 is low, such as depending on the type of power supply that is used to supply power at the terminal 56. That is, some power supplies are shorted to ground when they are switched off. Assume, for example, that such a supply were connected to the terminal 56 of the IC 50 and the short circuit protection system 52 were configured to turn on the isolation FET 62 based solely on its voltage being low. In such a situation, if the terminal 56 is shorted to ground and the voltage at 58 is sufficiently low so that the protection system 52 turns on the isolation FET 62, the pin 58 also would be shorted to ground through the isolation FET. Accordingly, in a situation when the isolation FET 62 is on and when the terminal 56 is grounded and the terminal 58 is low, voltage provided by the internal circuitry 68 will be unable to drive other internal circuitry, as it will also be grounded.

By way of particular illustration, during a power off condition, an associated spindle motor can provide current to the node 66 through the spindle driver 72 so as to enable the VCM to move to a safe zone (e.g., during retract). However, if the terminal 58 is grounded through the FET 62, the spindle motor might be unable to provide sufficient voltage to implement the desired retract. Therefore, in situations where the internal circuitry 68 may require power to perform certain functions when the power supplies are switched off, it may be desirable to configure the short circuit protection system 52 to control operation of the isolation FET 62 based on the voltage at both of the terminals 56 and 58, as described above.

The output of the short protection system 52 also is coupled to an inverter 82. The output of the inverter 82 is provided to an input of an AND gate 84. Another input of the AND gate 84 is coupled to receive a power on reset (POR) signal. The POR signal is active, for example, when any of the external supply voltages (e.g., VCC12) are low. The output of the AND gate 84 is provided to the gate of a transistor 86, which is coupled between the gate of the isolation FET 62 and electrical ground. The POR signal also is provided to an inverter 88, which provides an output related to the voltage VPUMP to the gate of the isolation FET 62 when the POR signal is low. Thus, when the protection system 52 detects a short circuit condition, its output is high, such that the output of the AND gate 84 is low.

Thus, the transistor 86 will be turned on when both the POR is active (e.g., high) and the protection system 52 provides a low output signal indicating the absence of a short circuit condition. In this situation, the gate of the isolation FET 62 is forced low through the transistor 86, which causes the isolation FET to be off. As mentioned above, when the isolation FET 62 is off, the internal circuitry 68 is electrically isolated from the input terminal 56.

Figure 3:
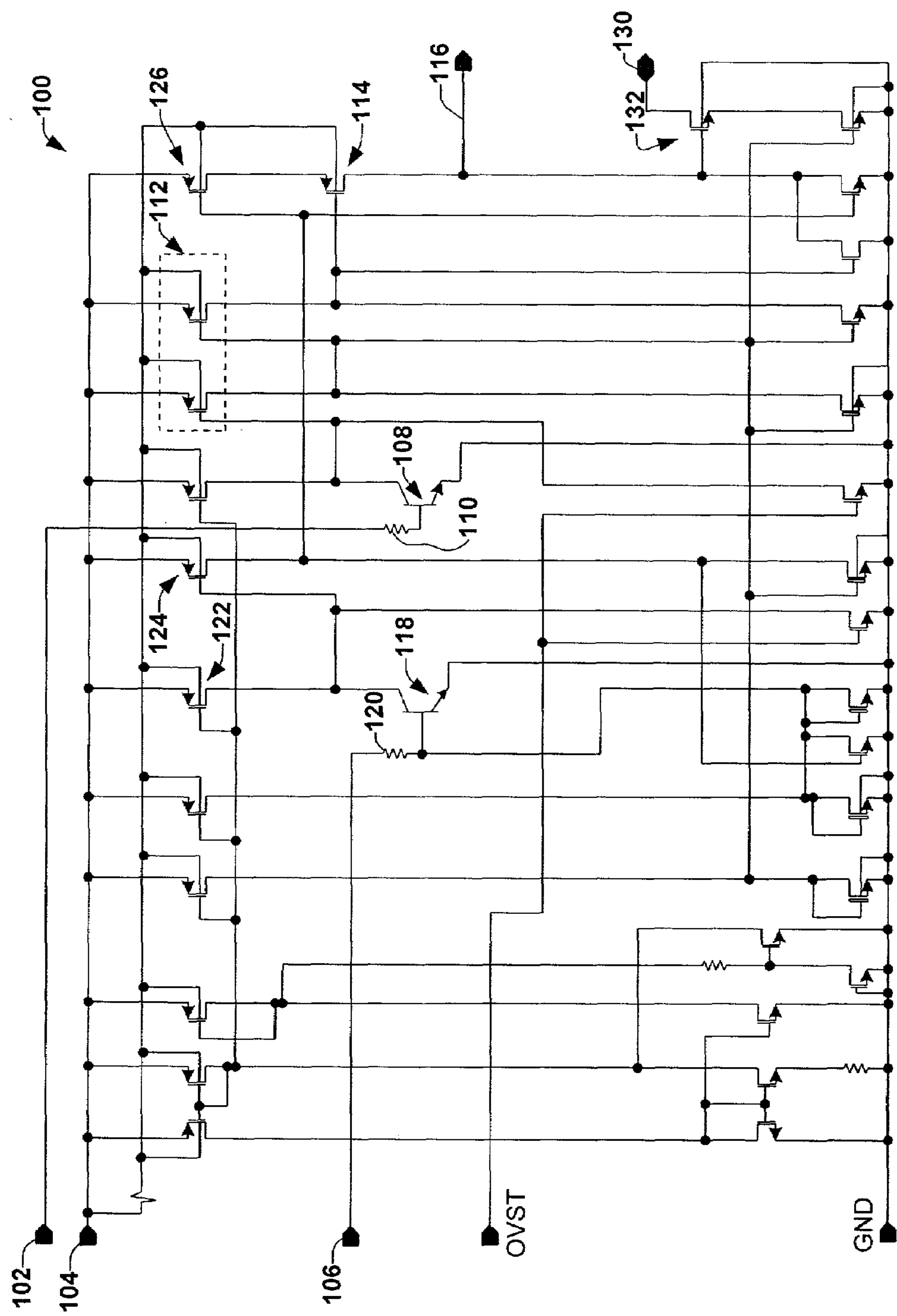
FIG. 3 is an example of a circuit diagram illustrating part of a protection system that can be implemented in accordance with an aspect of the present invention.

FIG. 3 depicts an example of part of a circuit 100 configured to implement short circuit protection in accordance with an aspect of the present invention. The circuit 100 includes a plurality of input terminals or pins 102, 104, and 106, each of which can be associated with a respective power supply. The terminal 102 is coupled to a base of a transistor 108 through a resistor 110. The terminal 102, for example, is coupled to a high power supply (e.g., VCC12), such as to provide power to the associated IC. The transistor 108 is turned on when the voltage at the terminal 102 is greater than ground. In the particular example in FIG. 3, the transistor 108 is activated when the base-emitter voltage is forward biased. In this way, the base-emitter voltage operates as a level detector (or comparator) for use in detecting a short circuit condition. Those skilled in the art will understand and appreciate alternative approaches that could be employed to implement such functionality, all of which are contemplated as falling within the scope of the present invention.

The collector of the transistor 108 is coupled to control an arrangement of transistors, indicated at 112. The transistors 112 are connected to the terminal 104, which provides a source of power (e.g., VCC5) to enable activation of transistors in response to the transistor 108 turning on. The drain of one of the transistors 1 12 is coupled to a gate of an output transistor 114. By this arrangement, the output transistor 114 is turned on if the voltage supplied to the terminal 102 is greater than about a forward diode voltage above electrical ground. The drain of the transistor 114 is further coupled to an output 116 that is operative to turn on an associated isolation FET if a short circuit condition is detected by the circuit 100.

The input terminal 106 is coupled to a base of another transistor 118 through a resistor 120. The transistor 118 thus is turned on if its base-emitter voltage is forward biased (e.g., slightly greater than ground) and is turned off if it is at or near electrical ground. The collector of the transistor 118 is coupled to a drain of a transistor 122. The transistor 122 is turned on when the terminal 104 is high, such that its source can provide about the voltage at the terminal 104 to its drain and the collector of 118. The collector of the transistor 118 also is coupled to a gate of another transistor 124. The transistor 124 is coupled between the input terminal 104 and a gate of another output transistor 126. The output transistor 126 is coupled between the input terminal 104 and a source of the other output transistor 114.

This arrangement provides for turning on the output transistor 126 when the transistor 118 is turned off due to a low voltage at 106. That is, when the voltage at the terminal 106 is low, transistor 124 is turned off and transistor 126 is turned on, such that the source of the transistor 114 is coupled to the input terminal 104 through the output transistor 126. Thus, if the voltage at the terminal 102 is high (e.g., greater than about ground potential) while the voltage at 106 is low (e.g., at or near ground potential), both of the transistors 114 and 126 will be turned on. When both the transistors 114 and 126 are turned on, the output 116 is coupled to the input terminal 104 so that the output 116 is high (e.g., about equal to the voltage at 104 less the voltage drops across transistors 114 and 126).

In contrast, if the voltage at 106 is high, the transistor 118 is turned on, which pulls the gate of the transistor 124 low. When the gate of the transistor 124 is low, it is turned on which turns transistor 126 off. As a result, a high voltage at 106 causes the output at 116 to be low. Similarly, if the voltage at 102 is low (e.g., at or near ground potential), the transistor 108 is off, which biases the transistors 112 on. This, in turn, causes the output transistor 114 to be off, resulting in the output 116 being low.

Those skilled in the art will understand that the output transistors 114 and 126 in the arrangement of FIG. 3 operate as a NOR gate in which the output 116 is low if either of the short circuit conditions associated with the voltages supplied at terminals 102 and 106 is not satisfied. Accordingly, those skilled in the art will understand various other arrangements that could be employed to implement the desired functionality in accordance with an aspect of the present invention; namely, to condition the output 116 on the voltage at the input 106 being low and the voltage at the input 102 being high.

The circuit 100 also includes another output 130, which is pulled low to mirror the output at 116. That is the output 116 is electrically coupled to a gate of a transistor 132 so as to turn the transistor on when the output 116 is high. When the transistor 132 is turned on the output 130 is coupled to ground to provide a low output signal.

While the circuit 100 is illustrated as employing NPN bipolar transistors 108 and 118 to determine if circuit conditions correspond to a short circuit condition, those skilled in the art will understand that other implementations could be used. That is, any circuitry (e.g., comparators, level detectors, and so forth) configured to determine the occurrence of a short circuit condition, such as based on the voltage at the input terminals 102 and 106, can be utilized in accordance with an aspect of the present invention.

Figure 4:
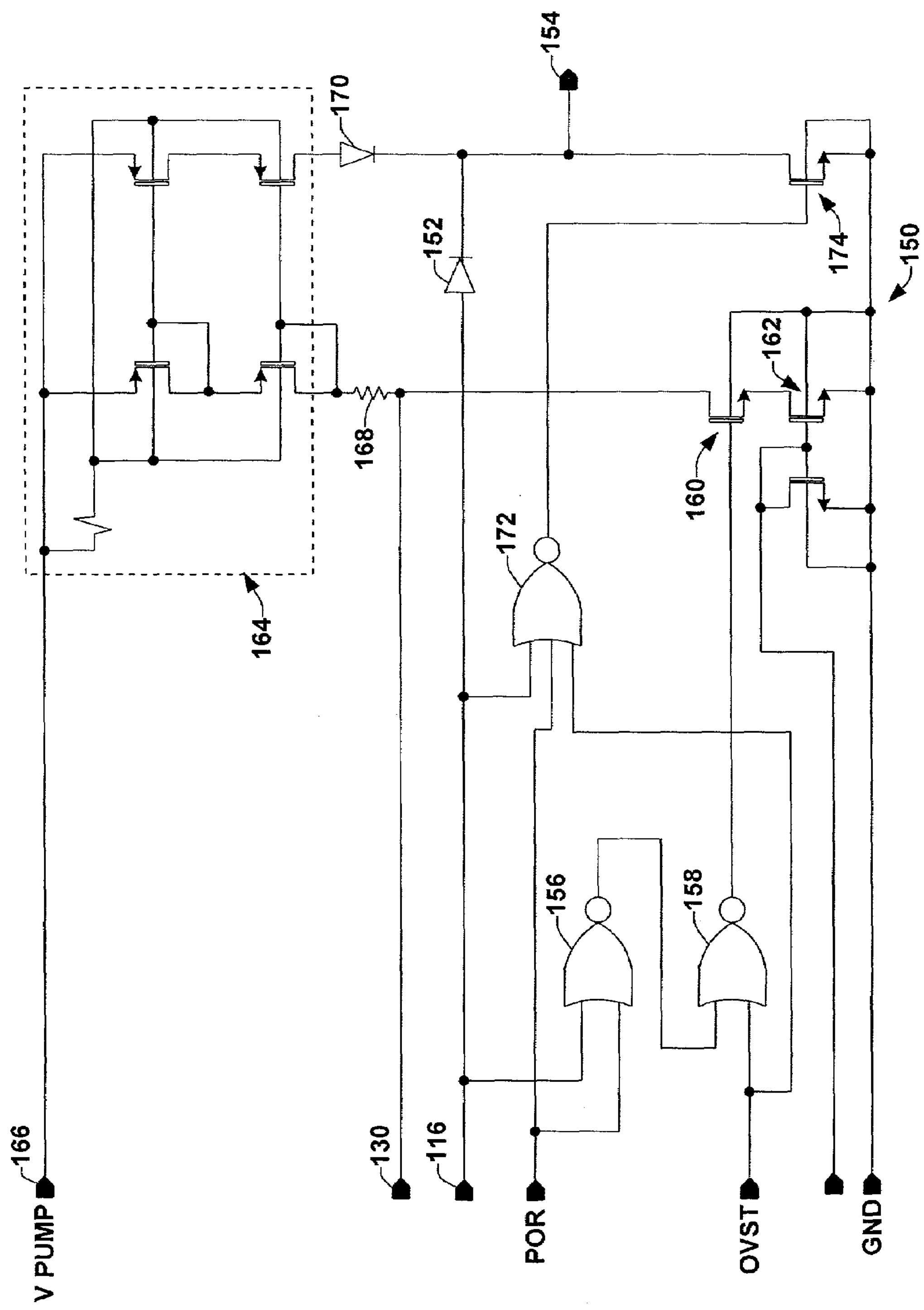
FIG. 4 is an example of a circuit diagram illustrating another part of a protection system that can be implemented in accordance with an aspect of the present invention.

FIG. 4 illustrates another part of a circuit 150 designed to implement short circuit protection by controlling an associated isolation FET in accordance with an aspect of the present invention. The circuit 150 receives as two of its inputs the outputs 116 and 130 of the circuit 100 of FIG. 3. The signal at 116 is provided to an anode of a diode 152 and thus is operative to forward bias the diode when the signal at 116 is high, as described above with respect to FIG. 3. As a result, when the output 116 is high, which corresponds to a short circuit condition, the diode 152 is biased to provide a high signal at an output 154 of the circuit 150. The output 154 can be provided to the gate of the isolation FET (not shown) and, in turn, turns the FET on when the output is high.

The circuit 150 also includes a NOR 156 gate that receives the signal provided at 116 and a POR signal as inputs. The output of the NOR gate 156 is provided to an input of another NOR gate 158. An OVST signal, which normally corresponds to a low (e.g., 0Volt) signal, is provided to another input of the NOR gate 158. The output of the NOR gate 158 is coupled to a gate of a transistor (e.g., a FET) 160. Thus, the output of the NOR gate 158 is high and turns on the transistor 160 so long as the OVST is low and one or both of the POR signal and the signal at 116 are high. When the transistor 160 is on, it couples the input provided at 130 to ground through an associated transistor 162.

The drain of the transistor 160 is coupled to the input 130 and to associated circuitry, indicated at 164. The circuitry 164 is coupled to an input terminal 166 that receives a VPUMP voltage as well as is coupled to receive the input at 130 through a resistor 168. The signal at 130 provides a control input for the circuitry 164. In particular, the circuitry 164 is turned off if the signal at 130 is high impedance and the transistors 160 and 162 are off. This corresponds to a situation, for example, when the signal at 116, the POR signal, and the OVST signal are all low. As a result, the transistors that form the circuitry 164 are turned off and NOR gate 172 is high. This turns transistor 174 on, pulling the output 154 to ground, which turns off the associated isolation FET. If the signal at 116 is high, NOR gate 172 will be low. This turns off transistor 174. Diode 152 can then be forward biased, pulling output 154 up to the level of signal 116 minus a forward diode voltage. If the signal 130 is low, the transistors that form the circuitry 164 are activated to couple the VPUMP voltage through the circuitry to the anode of diode 170. Those skilled in the art will understand and appreciate that the diodes 152 and 170 generally behave as an OR gate, which provides a level to the output 154 which is the higher of the voltages at 116 or at VPUMP.

Figure 6:
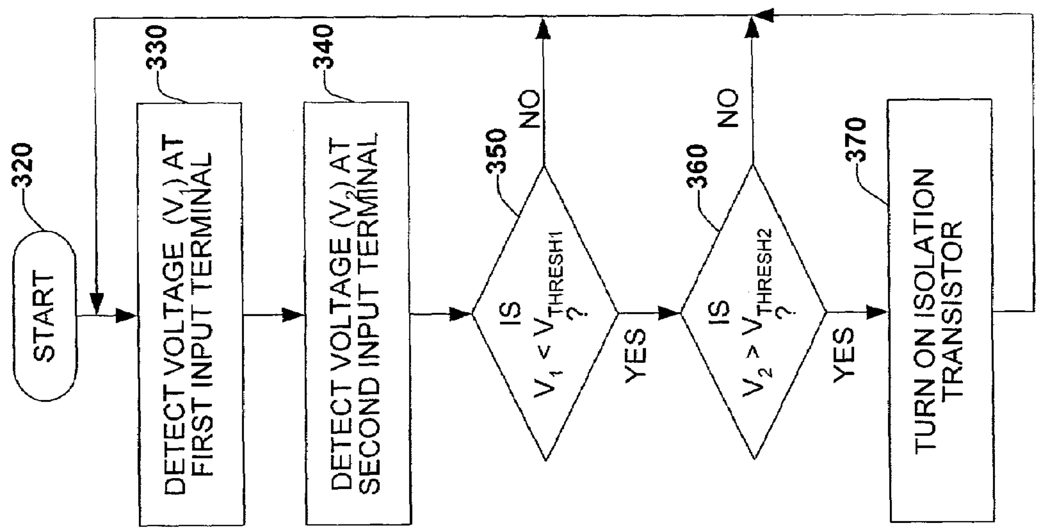
FIG. 6 is a flow diagram illustrating a methodology for protecting an integrated circuit during a short circuit condition in accordance with an aspect of the present invention.
Figure 5:
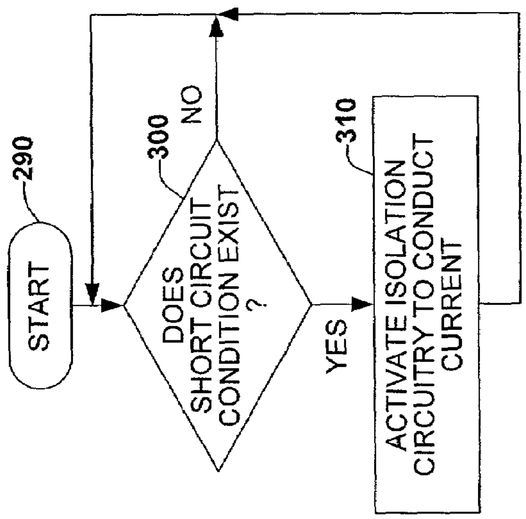
FIG. 5 is a flow diagram illustrating a simplified methodology for short circuit protection in accordance with an aspect of the present invention.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. For example, different operating states of associated circuitry or inputs can provide a basis for implementing desired functionality in accordance with an aspect of the present invention. Moreover, not all illustrated features may be required to implement a methodology in accordance with an aspect the present invention. It is to be understood that the functionality depicted in the following methodologies can be implemented in hardware, integrated circuits, software, or a combination thereof.

FIG. 5 is an example of a basic methodology for implementing short circuit protection in accordance with an aspect of the present invention. An IC includes at least one input terminal or pin for connecting to an internal power node through an isolation component or circuitry. The isolation component or circuitry can be internal or external to the IC. The IC may contain a second terminal connected to an external power supply. The methodology begins at 290, such as in connection with powering up the IC. Next, at 300, a determination is made as to whether a short circuit condition exists at the terminal. This determination can be made based on the voltage at the first terminal only. Alternatively, the determination can be based on the respective voltages at the first and second terminals. For example, a short circuit condition exists if the voltage at the second terminal is high (e.g., greater than ground) and the voltage at the first terminal is low (e.g., at or near ground). Alternatively, the determination can be based on the current in the isolation component or at the first or second terminal. Alternatively, the determination can be based on the current in the isolation component or at the second terminal and the voltage at the first terminal. For example, a short circuit condition exists if the current in the isolation component is large and the voltage at the first terminal is low (e.g., at or near ground). Thus, those skilled in the art will understand and appreciate that the determination at 300 can be based on any combination of electrical characteristics that indicate a short circuit condition at the first terminal, including or excluding electrical characteristics at the second terminal and/or the isolation component.

If the determination at 300 is negative, indicating that a short circuit condition does not exist, the methodology can loop at 300 so as to monitor the input or inputs for a short circuit condition. If the determination at 300 indicates that a short circuit condition exists, the methodology proceeds to 310. At 310, the isolation component is activated to a condition to electrically couple the internal power node to the external supply. This helps decrease power dissipation across a diode associated with the power component (e.g., a parasitic diode) that might occur in the absence of activating the power component at 310. The decrease in power dissipation across the diode further reduces the generation of heat.

FIG. 6 is an example of a methodology that can be employed to implement short circuit protection for an isolation component and associated integrated circuit in accordance with an aspect of the present invention. The integrated circuit, for example, can include a plurality of input terminals that receive supply voltages at one or more levels. One of the input terminals can be coupled to internal circuitry through an isolation component, such as an isolation FET having a parasitic diode. The isolation FET can be internal or external to the IC.

The methodology begins at 320, such as in conjunction with powering up the integrated circuit. Next, at 330, a voltage $V_1$ at a first input terminal is detected. The first input terminal, for example, is coupled to the internal circuitry of the IC. The internal circuitry can also get voltage from other sources, such as in situations when the isolation FET is turned off. At 340, a voltage at a second input terminal is detected. It is to be understood and appreciated that the voltage detections at 330 and 340 can occur continuously or discretely. The second input terminal, for example, receives a supply voltage at a desired level. When current is conducted through the isolation FET or its parasitic diode, this couples the second input terminal to the internal circuitry at the first input terminal.

At 350, a determination is made as to whether the voltage $V_1$ at the first input terminal is below a threshold voltage ($V_{THRESH1}$). If the determination is negative, the methodology returns to 330 to detect the voltages at the respective input terminals. In the event the determination is positive, the methodology proceeds to 360 in which another determination is made. The determination at 360 corresponds to determining whether the voltage $V_2$ at the second input terminal is greater than a threshold voltage ($V_{THRESH2}$). It is to be appreciated that the respective threshold may be identical ($V_{THRESH1}=V_{THRESH2}$) or they may be different. For example, $V_{THRESH1}$ can be equal to about ground potential (e.g., short circuited) and/or $V_{THRESH2}$ can be set to a voltage level greater than $V_{THRESH1}$. In this way, the determination at 350 corresponds to determining whether the voltage at the first input terminal is at or near ground potential. The determination at 360, in contrast, is to determine whether the voltage $V_2$ at the second terminal is greater than ground potential.

Those skilled in the art will understand and appreciate various threshold voltages that can be adapted for various applications to provide desired levels of protection. It is also to be appreciated that current or a combination of current and voltage at the respective terminals at 330 and 340 as well as in the isolation component could be utilized to provide a basis for determining the occurrence of a short circuit condition at 350 and 360 according to an aspect of the present invention.

If the determination at 360 is negative, the methodology also returns to 330 to continue to monitor the voltages at the respective terminals. If the determination at 360 is positive, the methodology proceeds to 370 in which the isolation component is turned on so as to conduct electrical current between the second terminal and the internal circuitry. In this way, the methodology can reduce power dissipation that would tend to occur in the event that the isolation component was turned off. The reduction in the power dissipation further results in less heat being generated and thereby helps protect the integrated circuit or isolation component during a short circuit condition.

What has been described above includes examples depicting how the present invention might be implemented. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A short circuit protection system, comprising:

an isolation component between a first terminal and a node coupled to other circuitry, the isolation component having a control input and being operative to conduct current from the first input terminal to the node based on at least one of a voltage potential across the isolation component and a signal provided at the control input; and a control system that provides a control signal to the control input of the isolation component in response to an electrical characteristic at a second terminal indicating a short circuit condition at the second terminal where the second terminal couples to the node without isolation, whereby current can be conducted through the isolation component during the short circuit condition to a spinning motor.

2. The system of claim 1, the isolation component further comprising a transistor having a parasitic diode in parallel between the first input terminal and the node.

3. The system of claim 1, the electrical characteristic at the second terminal comprising a voltage level.

4. The system of claim 1, the control system also detecting an electrical characteristic at the first terminal, the control system detecting the short circuit condition and providing the control signal based on the electrical characteristics at the first and second terminals.

5. The system of claim 4, the control system being configured to provide the control signal to activate the isolation component based on the voltage at the first input terminal being greater than a threshold level and the voltage at the second input terminal being less than about the threshold level.

6. The system of claim 5, the threshold level being near ground potential.

7. The system of claim 5, further comprising a third input terminal operative to supply power to enable operation of the control system during the short circuit condition.

8. The system of claim 4, the electrical characteristic at the second terminal being at least one of voltage and current and the electrical characteristic at the first terminal being at least one of voltage and current.

9. The system of claim 1, the control system also detecting electrical current in the isolation component, the control system detecting the short circuit condition and providing the control signal based on the electrical characteristic at the second terminal and the electrical current in the isolation component.

10. The system of claim 9, the control system also detecting an electrical characteristic at the first terminal, the control system detecting the short circuit condition and providing the control signal based on the electrical characteristic at the second terminal indicating a low voltage at the second terminal and based on at least one of the electrical characteristic at the first terminal and the current in the isolation component.

11. The system of claim 1, at least part of the system being implemented as part of an integrated circuit, the isolation component being one of internal and external relative to the integrated circuit.

12. The system of claim 1, the other circuitry comprising driver circuitry operative to drive an associated motor.

13. A protection system, comprising:

isolation circuitry operable to supply power to a motor electrically coupled between a first input terminal and associated circuitry, such that the first input terminal can supply power to the associated circuitry according to an operating state of the isolation circuitry;

a first detector coupled to a first input terminal to detect an electrical characteristic at the first input terminal and provide a first detector signal based on the detected electrical characteristic at the first input terminal;

a second detector coupled to a second input terminal to detect an electrical characteristic at the second input terminal and to provide a second detector signal based on the electrical characteristic at the second input terminal, the second input terminal being electrically coupled to supply power to the internal circuitry without isolation; and a short circuit protection control system that controls the operating state of the isolation circuitry based on the first and second detector signals.

14. The system of claim 13, the first detector provides the first detector signal to indicate whether a voltage supplied at the first input terminal exceeds a first threshold level.

15. The system of claim 14, the second detector provides the second detector signal to indicate whether a voltage supplied at the second input terminal is less than a second threshold level.

16. The system of claim 15, each of the first and second threshold levels being near ground potential.

17. The system of claim 15, the second detector including a transistor that is turned off if the voltage at the second input terminal is near electrical ground.

18. The system of claim 17, the first detector including a transistor that is turned on if the voltage at the first input terminal is greater than electrical ground.

19. The system of claim 18, the respective transistors of the first and second detectors having a condition that varies according to voltages at the respective first and second input terminals.

20. The system of claim 17, the short circuit protection control system activating the isolation circuitry to an on operating state to conduct current from the first input to the associated circuitry based on the first and second detector signals indicating a short circuit condition at the second input terminal.

21. The system of claim 13, the isolation circuitry further comprising a transistor having a parasitic diode connected in parallel between the first input terminal and the node.

22. The system of claim 13, each of the electrical characteristics at the first and second input terminals comprising at least one of voltage and current.

23. The system of claim 22, further comprising a current detector that detects electrical current in the isolation circuitry, the short circuit protection control system controlling the operating state of the isolation circuitry based on the electrical characteristic at the second input terminal and at least one of the electrical current in the isolation component and the electrical characteristic at the first input terminal.

24. The system of claim 13, further comprising circuitry operative to control activation and deactivation of the isolation circuitry based on a control signal from the short circuit protection control system indicating an absence of the short circuit condition and a power on reset signal indicating at least one power supply associated with the system is low.

25. The system of claim 13, at least part of the system being implemented as an integrated circuit, the isolation circuitry being one of internal and external relative to the integrated circuit.

26. An integrated circuit to control at least one motor, comprising:

a first input terminal operative to receive a first supply voltage;

drive circuitry operative to selectively energize at least one phase of a spindle motor;

an isolation component connected between the first input terminal and the drive circuitry to provide power to the spindle motor;

a second input terminal operative to receive a second supply voltage, the second input terminal electrically coupled without isolation to supply power to the drive circuitry; and a short circuit protection system electrically connected to receive an indication of an electrical characteristic at the second input terminal, the protection system being operative to control the isolation component to an on condition so as conduct current therethrough in response to detecting a short circuit condition associated with the second input terminal, whereby power dissipation through the isolation component is reduced during the short circuit condition.

27. The integrated circuit of claim 26, the isolation component further comprising a transistor and diode connected in parallel between the first input terminal and a node to which the drive circuitry is connected.

28. The integrated circuit of claim 26, the protection system also receiving an indication of an electrical characteristic at the first input terminal, the protection system detecting the short circuit condition and providing the control signal based on the electrical characteristics at the first and second input terminals.

29. The integrated circuit of claim 28, the electrical characteristic at the first input terminal comprising at least one of voltage and current, and the electrical characteristic at the second input terminal comprising at least one of voltage and current.

30. The system of claim 29, further comprising a current detector that detects electrical current in the isolation component, the short circuit protection system controlling the isolation component to the on condition based on the electrical characteristic at the second input terminal and at least one of the electrical current in the isolation component and the electrical characteristic at the first input terminal.

31. The integrated circuit of claim 28, the protection system being configured to activate the isolation component to the on condition based on the voltage at the first input terminal being greater than a threshold level and the voltage at the second input terminal being less than about the threshold level.

32. The integrated circuit of claim 31, the threshold level being about electrical ground potential.

33. The integrated circuit of claim 26, the drive circuitry further comprising a spindle motor driver operative to energize at least one phase of a spindle motor, the spindle motor driver operative to supply power to other circuitry internal to the integrated circuit if at least one power supply is low.

* * * * *